J. T. CLARK.
VEHICLE TIRE.
APPLICATION FILED SEPT. 27, 1913.
1,117,481.
Patented Nov. 17, 1914.
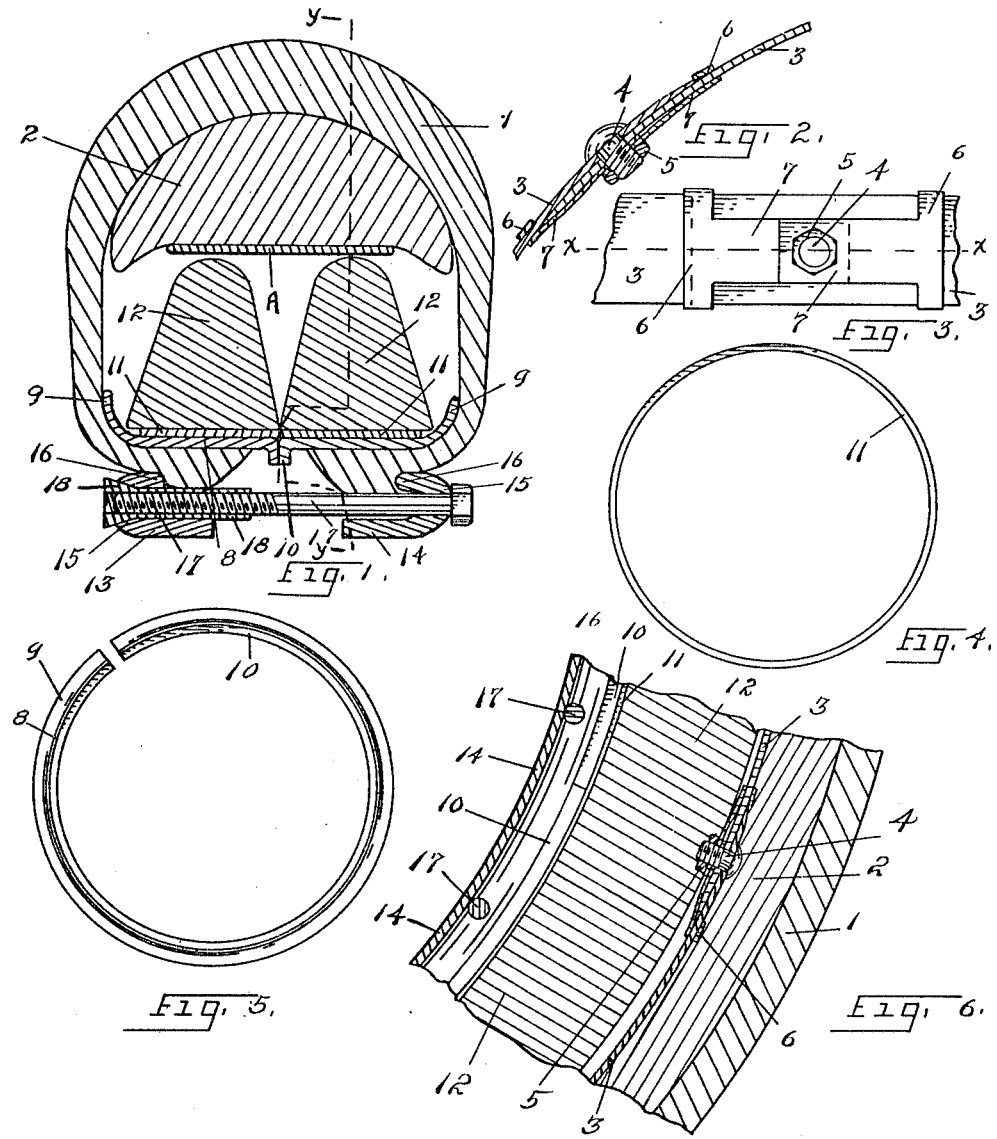

UNITED STATES PATENT OFFICE.

JOHN T. CLARK, OF PROVO, UTAH.

VEHICLE-TIRE.

1,117,481.      Specification of Letters Patent.     Patented Nov. 17, 1914.

Application filed September 27, 1913. Serial No. 792,209.

*To all whom it may concern:*

Be it known that I, JOHN T. CLARK, a citizen of the United States, residing at Provo, in the county of Utah and State of Utah, have invented certain new and useful Improvements in Vehicle-Tires, of which the following is a specification.

My invention relates to vehicle tires and has for its object to provide a resilient vehicle tire in which a spring effect is given to a wheel without the pneumatic principle being used, and to provide a vehicle tire which may be used on the automobiles now constructed with but slight changes in the wheel and whereby resiliency is secured in the tire by mechanical means.

The invention consists of the novel construction and combination of parts hereinafter described and illustrated in the accompanying drawings forming a part of this application, in which drawings similar letters of reference indicate like parts throughout the several figures.

In the drawings Figure 1 is a transverse section radially of the tire with the tensioning bolt shown in elevation. Fig. 2 is a fragmentary view showing a longitudinal section of the splice in the spring band and securing means on line $x$ $x$ of Fig. 3. Fig. 3 is a plan view of the same looking radially outward. Fig. 4 is a side elevation of one of the holding bands. Fig. 5 is an elevation of one of the floating bands. Fig. 6 is a fragmentary view of a portion of the assembled tire in longitudinal section on line $y$ $y$ of Fig. 1.

It is my intention to and I have so far used an outer casing 1 similar to the ones now used on automobiles and other vehicles in which compressed air is used as the inflating element. Within said casing and fastened to its inner periphery, by a rubber cement, is a cushioning band 2 made of an an elastic, flexible material preferably soft rubber. Concentrically within said cushion band 2 is placed a spring metal band A, made of a piece of spring metal 3 having holes through its end portions within which a clamping bolt 4 is inserted and a nut 5 is screwed thereon. Sheathing clips 6 are held in place over the end portions of said metal strips by means of integral wing portions 7 formed thereon and having a hole in each, through which said bolt 4 is inserted, thereby securing said clips in place, which clips in turn act as additional securing means for the ends of the spring metal strip when formed into the spring band A. Two metal strips are formed into band shape and used as the floating bands 8, which are inserted within said casing 1, each having an outwardly extended flange 9 and an inwardly extended flange 10 formed thereon, and when they are in place within the said casing the flanges 10 are contiguous. An endless metal band 11 is carried on each of said floating bands 8 when in position in the tire, and on each of said endless bands 11 an inner cushion or buffer band 12 is carried of a radial thickness which will occupy most of the space between the outer periphery of said endless bands 11 and the inner periphery of the spring band A. The sides of each of said buffer bands are inclined toward each other in order to allow lateral spaces within which said buffer bands may spread when under compression. Any of the casing tensioning means now known may be used to tension said outer casing over and around said cushion band 2 and the floating bands 8 to hold them concentric and to draw said cushion band radially inward and said floating bands radially outward; the ones shown being endless annular bands 13 and 14. Each of said annular bands 13 and 14 has a portion turned as an outwardly extended flange 15, which flanges 15 are opposed in position and curved toward the other to form casing-bead engaging lugs 16. Each of said flanges 15 has openings or holes therein within which the tensioning bolts 17 are inserted; and when said bolts are screwed within tapered sleeve nuts 18 which engage in the opposed flange 15, the said casing 1 is drawn tightly over and around the cushion band 2 and the floating bands 8.

In assembling the elements which make up my tire it is preferable to cement the cushion band 2 in place within the casing 1 and then to place the spring band A within said casing and with its outer periphery so nearly the size of the inner periphery of the cushion band that the bolt head and clips 6 will be pressed somewhat into said cushion band. This I do by cutting the metal strip of sufficient length that when the holes are punched and the said strips 3 fastened into band form the circumference of said band A will be great enough to press the bolt head and clips into said cushion band. Said spring band A is not as wide as the cushion band 2 in order that when under tension by said casing and especially when compressed by a load on the vehicle the edges of said cushion band will be drawn over the edges of said spring band A and prevent it from wearing the inside of said casing 1.

By springing the edges of said casing 1 away from each other the floating bands 8 may be inserted within the said casing, with the flanges 9 bearing against the inside of said casing. In order that this may be readily and quickly done the bands 8 are severed and when in place within the casing the endless bands 11 are inserted within said casing and made to inclose or encircle said floating bands to take the stress of the outward pull on said floating bands when the casing 1 is tensioned. In order that the buffer bands 12 may be placed on said endless bands 11, the edges of the casing and the two sets of bands 8 and 11 are spread apart and the buffer bands, one at a time, are placed in position on said endless bands. Said buffer bands 12 are made of flexible elastic material preferably of soft rubber and they act as cushions or buffers for the said spring band A when it is under more than the ordinary stress or load, and this is particularly desirable on drays or other vehicles used for heavy loads.

I thus provide a resilient tire wherein the outer casing is prevented from collapsing by mechanical means instead of with compressed air, and secure a resilient tire without using the pneumatic principle while retaining the outward appearance of such inflated tires.

Having thus described my invention I desire to secure by Letters Patent and claim:—

1. In a vehicle tire the combination of a strip of spring metal bent into circular form having a hole in each end portion; a clip member having a rectangular opening therein adapted to sheath the end of said metal strip and encircle a contiguous portion of said metal strip; a wing formed on one edge of said clip member and having a hole therein; a bolt inserted through the holes in said metal strip and the hole in said wing; a nut on said bolt; and a tubular casing inclosing said metal strip when formed into a band.

2. In a vehicle tire the combination of a strip of metal bent into circular form and having a hole in each end portion; a pair of clips having alined openings in each through which said metal strip is inserted; a wing on each of said clips and provided with a hole in each; means inserted through the holes in said wings and metal strip to hold said clips in place on said metal strip and form a band thereof; and a tubular flexible casing inclosing said metal strip when formed into a band.

In testimony whereof I have affixed my signature in presence of two witnesses.

JOHN T. CLARK.

Witnesses:
W. R. WILLIAMS,
SAM RANEY.

Copies of this patent may be obtained for five cents each, by addressing the "Commissioner of Patents, Washington, D. C."